United States Patent [19]

Otsuki

[11] Patent Number: 5,446,826
[45] Date of Patent: Aug. 29, 1995

[54] MEMBERSHIP FUNCTION TUNING SYSTEM USING DEFUZZY CALCULATION

[75] Inventor: Satoshi Otsuki, Ikeda, Japan

[73] Assignee: Ricoh Company, Ltd., Tokyo, Japan

[21] Appl. No.: 165,875

[22] Filed: Dec. 14, 1993

[30] Foreign Application Priority Data

Dec. 15, 1992 [JP] Japan .................. 4-354220

[51] Int. Cl.$^6$ ............................. G05B 13/02
[52] U.S. Cl. ........................... 395/3; 395/900
[58] Field of Search ........... 364/157, 165, 550; 395/3, 10, 11, 50, 51, 61, 900, 906; 384/550, 157, 165

[56] References Cited

U.S. PATENT DOCUMENTS

| | | | |
|---|---|---|---|
| 4,864,490 | 9/1989 | Nomoto et al. | 364/157 |
| 5,051,932 | 9/1991 | Inoue et al. | 364/550 |
| 5,153,807 | 10/1992 | Saito et al. | 364/165 |
| 5,159,547 | 10/1992 | Chand | 364/157 |
| 5,241,651 | 8/1993 | Ueda | 395/61 |
| 5,251,288 | 10/1993 | Nomura et al. | 395/51 |
| 5,295,061 | 3/1994 | Katayama et al. | 364/157 |

FOREIGN PATENT DOCUMENTS

| | | | |
|---|---|---|---|
| 2105901 | 4/1990 | Japan | G05B 13/02 |
| 4085603 | 3/1992 | Japan | G05B 13/00 |

Primary Examiner—Robert W. Downs
Assistant Examiner—Tariq Hafiz
Attorney, Agent, or Firm—Popham, Haik, Schnobrich & Kaufman, Ltd.

[57] ABSTRACT

The present invention calculates an error between an output expected value with respect to an input of fuzzy inference and an output result of fuzzy inference using a singleton as the conclusion-membership function, calculates the distance proportional to the ratio of the degrees of contribution of each conclusion-membership functions in the defuzzy calculation for fuzzy inference, and uses the error and the distance as the basis to update tuning of the conclusion-membership function.

8 Claims, 10 Drawing Sheets

MEMBERSHIP FUNCTION TUNING SYSTEM USING DEFUZZY CALCULATION

BACKGROUND OF THE INVENTION

The present invention relates to a fuzzy inference apparatus and in particular, to a membership function tuning apparatus which automatically tunes membership functions.

More precisely, it is necessary to determine rules and a membership function when fuzzy inference is executed, but the task of determining these is currently performed by a system planner. However, the rules and membership functions created by the system planners are not used in that form and so it is necessary to implement optimization processing. The present invention therefore relates to a tuning apparatus which corrects rules and the membership functions created by humans while at the same time adjusting the membership functions so that fuzzy inference is efficiently executed.

A fuzzy inference apparatus uses vague information to perform inferences, and these inferences are performed in accordance with a plural number of production rules (hereinafter simply termed "rules").

A typical example of such rules is a condition-action rule. The condition-action rule is formed from a condition part (an "if" statement) and an action part (a "then" statement). The condition part is formed from one or more conditions, and a plural number of conditions are coupled by "AND". Also, the action part (the "then" statement) is formed from a single action.

As an example, when there is one condition, the rule is expressed as follows, if A is $\alpha$ then X is $\gamma$     (1)

and when there are two conditions, the rule is expressed, as follows, if (A is $\alpha$) and (B is $\beta$) then X is $\gamma$     (2)

In each of the above statements, A and B are the input variables, X is the output variable and $\alpha$, $\beta$ and $\gamma$ are the membership functions. In addition, if necessary, $\alpha$ and $\beta$ can be further identified as condition-membership functions, and $\gamma$ as a conclusion-membership function. Furthermore, the "A is $\alpha$" in the above statement (1), and the "(A is $\alpha$)" and the "(B is $\beta$)" in the above statement (2) are conditions, with the condition part being formed from the conditions "A is $\alpha$" in the case of statement (1) and "(A is $\alpha$)" and "(B is $\beta$)" in the case of statement (2). Lastly, the statement which forms the conclusion is the action part, and in the case of each of the statements described above, is "X is $\gamma$".

Here, the input variable and the output variable are ordinary numerical values (or more broadly defined as real numbers), and are called singletons to distinguish them from the membership function.

The object of the present invention is an inference method using ordinary numerical values (singletons) for the conclusion-membership functions. This is generally called a simplification method. In this case, the conclusion-membership function "$\gamma$" is a singleton but in this specification, for the sake of convenience of expression, it is called a conclusion-membership function.

A fuzzy inference apparatus executes inference in accordance with an inference rule which is a group of a plural number of the rules described above, and the inference method is of the type which is called a simplification method. Fuzzy inference according to simplification methods is generally expressed by grade calculations, MIN-MAX calculations and defuzzy calculations.

Firstly, a grade calculation is processing to determine a grade for which a condition of each condition part of each rule matches reality (an input value), and is implemented as an calculation or a table look-up which determines a membership value of a membership function.

Regarding the MIN-MAX calculations, a MIN calculation is processing to determine a degree of conformity of the match between each condition statement of each rule and reality, and is performed by the above grade MIN calculations. On the other hand, a MAX calculation is processing to determine the degree to which the action part of each rule contributes to the inference result, and result of MAX calculation which is the degree of suitability of rule having same action parts, and when same part as other action part does not have in all of rule, the degree of suitability of the action part changes to the degree of contribution. The defuzzy calculation is processing to obtain an inference result by means of the average value of the height of the membership function of the membership function value.

When these fuzzy inferences are executed, it is first necessary to determine the rules and the membership function. Generally, the user first creates these either empirically or by sensory intuition. The method of determining the rule and membership function is essential for fuzzy control, and can be described as a large task for the system in accordance with human experience or senses.

However, this is not sufficient in reality and it is necessary to perform tuning of the rules and membership function. This is called optimization processing. A membership function of fuzzy inference is a non-linear function of the input values and the output results and so there is no quantitative method for performing the tuning and, user performs tuning by trial and error.

The simplification method makes the conclusion-membership function a singleton and so the tuning of the membership function requires less effort when compared to the conventional method. Nevertheless, even if the conclusion-membership function is a singleton, its determination must still be performed by trial and error, with the accompanying difficulties. Furthermore, with the conventional method, the necessity to correct the conclusion-membership function after correction of condition-membership function or rule increases the degree of difficulty of the creation of data.

One method for the solution of this problem is, for example, the fuzzy tuning apparatus of Japanese Laid Open Patent 90-105901 (hereinafter termed Conventional Art 1), which uses the input and output data as the basis to determine the degree of suitability, and then uses the degree of suitability and the input and output as the basis either to solve simultaneous equations or to determine a function obtaining the least square of the degree of suitability so that a conclusion-membership function consisted of singleton is obtained.

In addition the fuzzy tuning apparatus disclosed in Japanese Laid Open Patent 92-85603 (hereinafter Conventional art 2) operates observed values obtained from the control object to obtain the features value of the control response. The evaluation value which represents the controllability is determined from evaluation value obtained from feature value or evaluation value or evaluation value obtained from a predetermined calculation equation which represents the controllability. The optimization algorithm uses these evaluation value. A fuzzy tuning apparatus uses the calculation results of calculation by the optimization algorithm to perform a search calculation for the membership function, and obtains the conclusion-membership function in accordance with the calculation results of the search calculation and the calculation results of the optimization algorithm calculation.

In Conventional Art 1, when a precision and the input and output data are used as the basis to determine simultaneous equations, then when the number of rules and the number of pairs of input and output data for a inference object are the same, it is possible to determine a real number value. However, when the number of input and output is less than the number of rules, a solution is not able to obtain, there is a problem in Conventional Art 1 as several input and output data are ignored when the number of pairs of input and output data is less than the number of rules.

Also, Conventional Art 1 is possible to apply the case that the number of pairs of input and output data is greater than the number of rules, when it's case determine the least square of the degree of conformity. However Conventional Art 1 is not able to apply when number of pairs of input and output data is not greater than the number of rules.

Furthermore, in the case of Conventional Art 2, the calculation for conclusion-membership function complex so the configuration also becomes complex and there is not only the problem of the entire apparatus becoming large and consequently expensive, but also the problem of the long calculating time.

By the way, it is possible to use the simplification method so that the expected output values for the inference and the input value can be completely determined and the grade operation and the MIN-MAX calculation are generally non-linear calculations and the defuzzy operation is a linear operation.

In the simplification method, the grade calculation and the MIN-MAX calculation are generally non-linear calculation, and the defuzzy calculation is a liner calculation. The defuzzy calculation is possible to grasp the input of calculation and the expected output value perfectly.

Also, the factors for the determination of the characteristics of fuzzy inference are the three characteristics of the fuzzy inference, the rule and the conclusion-membership function. Here, it is assumed that the conclusion-membership function and the rule are sufficiently appropriate.

When a number of n input data is input, contribution $h = \{h_1, h_2, \ldots h_m\}$ is possible to instantly know from the fuzzy inference input value $D_{in} = \{D_{in1}, D_{in2} \ldots D_{inn}\}$. Contribution h is one of input of defuzzy calculation. Moreover, m is the number of conclusion-membership functions.

The output expected value $D_{EXP}$ of the fuzzy inference is the output expected value for the defuzzy calculation while the defuzzy calculation is an operation of weighted averaging and is linear so that the value of the conclusion-membership function which is another defuzzy input can be obtained by solving multiple simultaneous equations.

$$\frac{\sum_{i}^{m} h_i MF_i}{\sum_{i}^{m} h_i} = D_{EXP} \tag{3}$$

$$\frac{h_1}{\sum_{i}^{m} h_i} MF_1 + \frac{h_2}{\sum_{i}^{m} h_i} MF_2 + \ldots + \frac{h_m}{\sum_{i}^{m} h_i} MF_2 = D_{EXP} \tag{4}$$

Here, $h_i$ is the degree of contribution of the conclusion-membership function 'i', $MF_i$ is the value of the conclusion-membership function 'i', and 'm' is the number of conclusion-membership functions.

If 'm' number of pairs $\{D_{in1l}, D_{in2l}, D_{innl}, D_{EXPil}\}$ (where $l = 1, 2, \ldots$ m) of input values and output expected values (hereinafter termed 'learning data') are given, then m pairs of degrees of contribution and output expected values $(h_{1\ 1}, h_{2\ 1}, \ldots, h_{m1}, D_{EXPi})$ are obtained, and equation (4) above becomes $$\frac{h_{1l}}{\sum_{i}^{m} h_i} MF_1 + \frac{h_{2l}}{\sum_{i}^{m} h_i} MF_2 + \ldots + \frac{h_{ml}}{\sum_{i}^{m} h_i} MF_m = D_{EXPl} \tag{5}$$

and this is the 'm' number of simultaneous equations, so, $MF_1, MF_2, \ldots, MF_m$ can all be determined.

However, with these methods, a solution is not obtained with respect to less than 'm' pairs of learning data, and it is not possible for learning data of more than m pairs to be reflected in the solution. Conversely, all of the learning data are completely and evenly reflected in the solution. This system assumes that the characteristics required of the system are incorporated into learning data of the minimum data amount (m pairs) and so above method is not only not possible but also unrealistic.

SUMMARY OF THE INVENTION

Accordingly, a general object of the present invention is to provide a novel and effective tuning apparatus of membership function that eliminates the problems described for the above Conventional Art.

A specific object of the present invention is to provide a membership function tuning apparatus which focuses on completely determining the input and output expected values for the for the defuzzy calculation which is linear, and which enables automatic tuning of the conclusion-membership function in a short time and individually with each piece of learning data.

The above objectives can be attained by a tuning apparatus which tunes a membership function to perform fuzzy inference using a singleton as the conclusion-membership function, the tuning apparatus comprises an error calculation portion for determining an error between an output result of fuzzy inference and an output expectation value with respect to an input value of fuzzy inference, a distance calculation portion for calculating a total sum of heights of all conclusion membership functions in a defuzzy calculation in the fuzzy inference, calculating a ratio of a height of each conclusion-membership function in the total sum, calculating a distance in proportion to the ratio of the height, a updating portion for tuning and updating of conclusion-membership function by shifting a position of the conclusion-membership function according to the distance calculated by the distance calculation portion and an error determined by the error calculation portion, and a control portion for controlling the error calculation portion, the distance calculation portion and the updating portion.

DESCRIPTION OF THE PREFERRED EMBODIMENTS

The following is a description of the preferred embodiments, with reference to the appended drawings.

First is a description of the outline of a fuzzy inference system to which the present invention has been applied.

If 'i' is an integer (i=1, 2, ..., m) from 1 to m over the conclusion-membership function $MF_i$ prior to tuning, the conclusion-membership functions $MF_i'$ after tuning, the learning coefficient is $\eta$, the output expected value is $D_{EXP}$ and the inference output value is $D_{out}$, then the relationship of following equation (6) is established and it is then possible to use this to obtain the data $MF_i'$ of the new conclusion-membership functions.

$$MF_i' = MF_i + (D_{EXP} - D_{OUT}) \frac{h_{ml}}{\Sigma h_{il}} \quad (6)$$

Equation (6) shows that the membership function $MF_i$ prior to tuning is proportional to the proportion that the difference (hereinafter termed 'error') between the output expected value $D_{EXP}$ and the inference output value $D_{OUT}$ and the degree of contribution (height) of the conclusion-membership function are of the sum of all the heights (degree of contribution of a $MF_j$), and that the data of the conclusion-membership function is corrected.

More specifically, equation (6) calculates the error of the output expected value with respect to the output results of fuzzy inference and said input, and calculates the distance proportional to the ratio of the heights of each conclusion-membership function and the total sum of heights of all conclusion-membership functions in the defuzzy calculation for said inference. If the membership function prior to tuning is added product of result of calculation as error and the degree of a contribution, then the new tuning function $MF_i'$ is obtained. The following is a detailed description of the above system.

Figure 1:
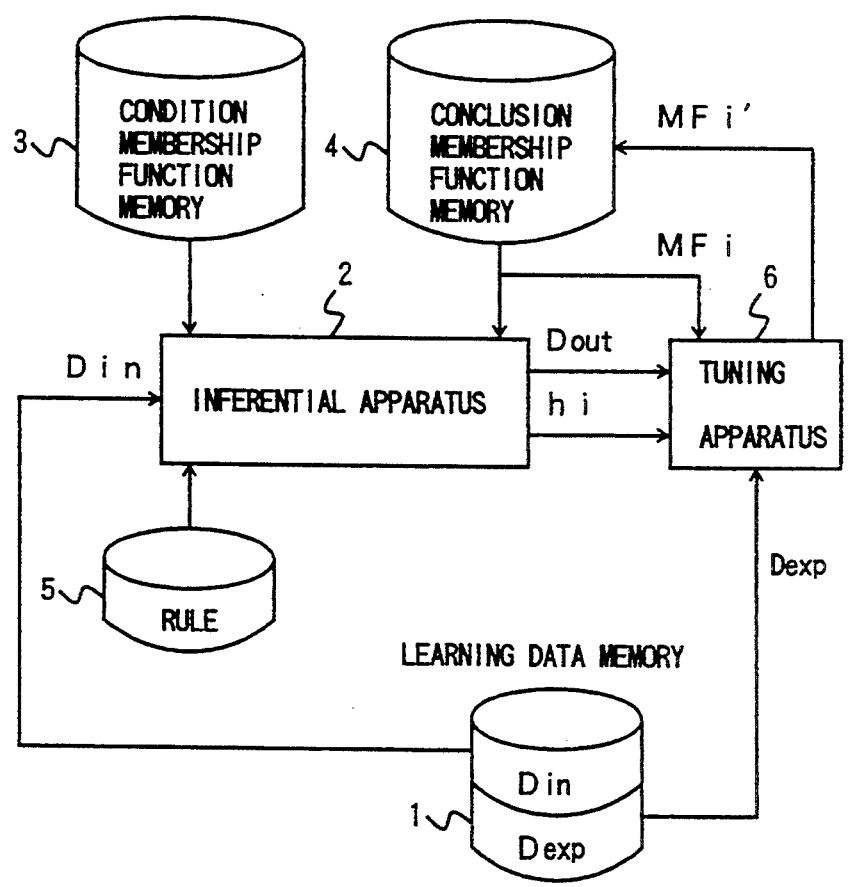
FIG. 1 is a view showing a general fuzzy inference system.

FIG. 1 is a view showing the constitution of a general fuzzy inference system. This system is comprised from a learning data memory 1, an inferential apparatus 2, a condition-membership function memory 3, a conclusion-membership function memory 4, rule memory 5 and tuning apparatus 6. The inferential apparatus 2 executes inference in accordance with the rule which is stored in the rule memory 5, condition-membership function stored in the condition-membership function memory 3, the conclusion-membership function $MF_i$ stored in the conclusion-membership function memory 4 and the input data $D_{in}$ stored in the learning data memory 1, and outputs the inference output value $D_{OUT}$.

Figure 2:
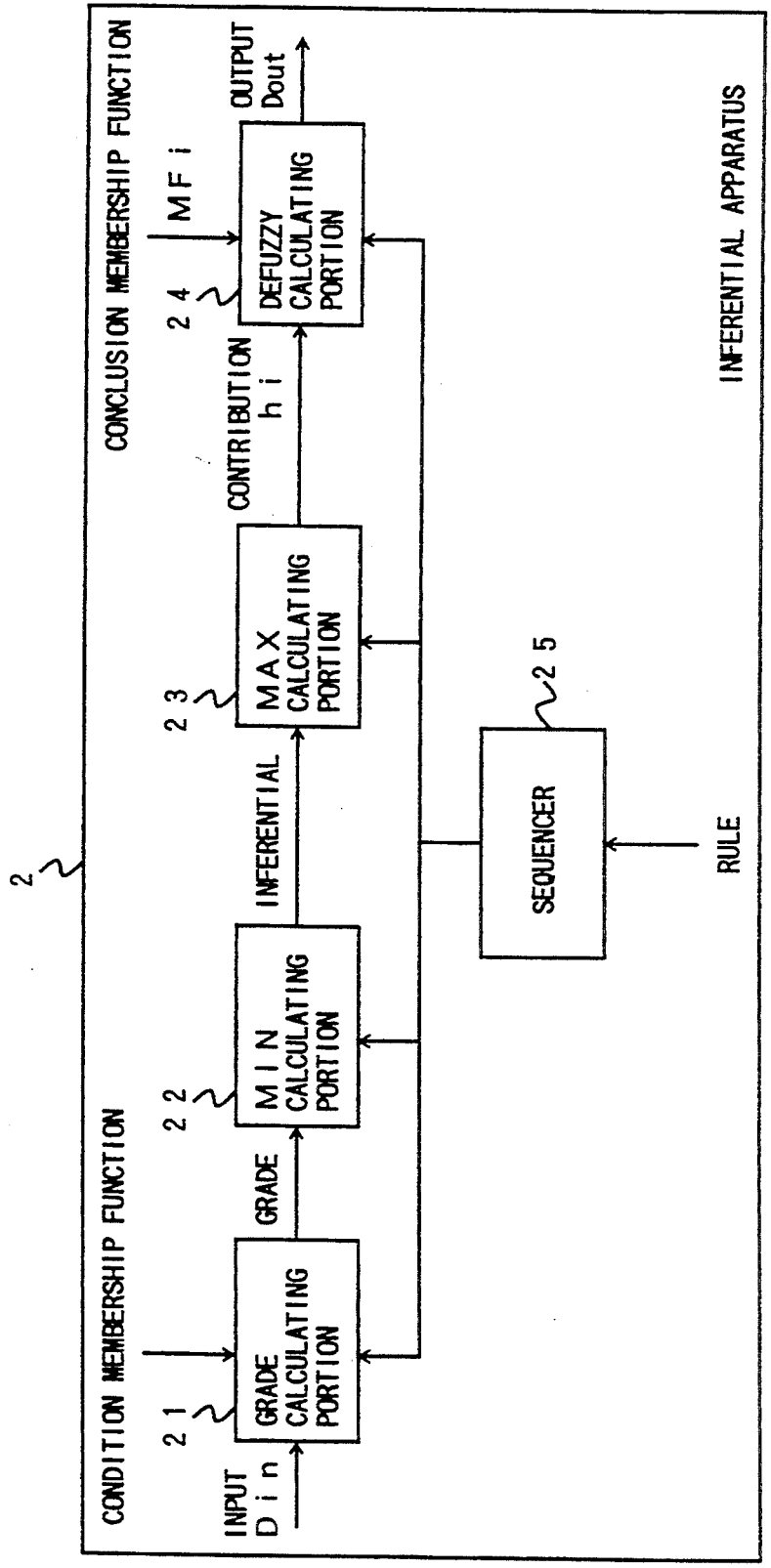
FIG. 2 is a block diagram of a circuit of an inference apparatus of a first inference system to which the present invention has been applied.

As shown in FIG. 2, the inferential apparatus 2 is comprised from the grade calculation portion 21, the MIN calculation portion 22, the MAX calculation portion 23, the defuzzy calculation portion 24 and the sequencer 25 which controls these calculations in accordance with the rule read from the rule memory 5.

The grade calculation portion 21 inputs the input value $D_{in}$ from the learning data memory 1 and the condition-membership function stored in the condition-membership function memory 3, calculates the grade and outputs that result to the MIN calculation portion 22. The MIN calculation portion 22 uses the grade which is input from the grade calculation portion 21 as the basis to perform a MIN calculation, determines the degree of suitability and outputs to the MAX calculation portion 23. The MAX calculation portion 23 inputs the degree of suitability which is output from the MIN calculation portion 22, performs a MAX calculation and outputs the degree of contribution $h_i$ to the defuzzy calculation portion 24. The defuzzy calculation portion 24 uses the degree of contribution $h_i$ input from the MAX calculation portion 23 and the conclusion-membership function $MF_i$ input from the conclusion-membership function memory 4 as the basis to calculate the inference output value $D_{OUT}$ and output it.

Moreover, the constitution of the inferential apparatus 2 may be any constitution where the degree of contribution $h_i$ and the inference output value $D_{OUT}$ can be output corresponding to a required input value $D_{in}$. For example, the product-sum method can be used instead of the MIN-MAX method.

[FIRST EMBODIMENT]

The following is a description of a first embodiment.

Figure 3:
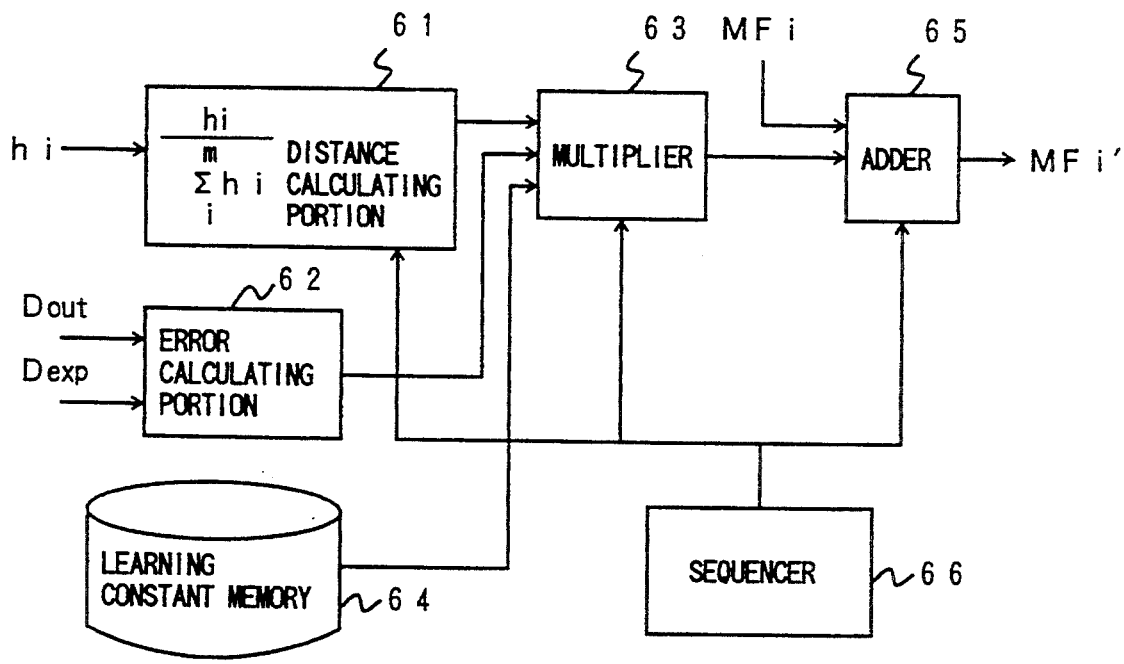
FIG. 3 is a block diagram of a circuit of a first embodiment according to the present invention.

As shown in FIG. 3, the tuning apparatus 6 is comprised from a distance calculation portion 61, and error calculation portion 62, a multiplier 63, a learning constant memory 64, an adder 65 and a sequencer 66.

The sequencer 66 controls the calculation of the distance calculation portion 61, the multiplier 63 and the adder 65.

Figure 4:
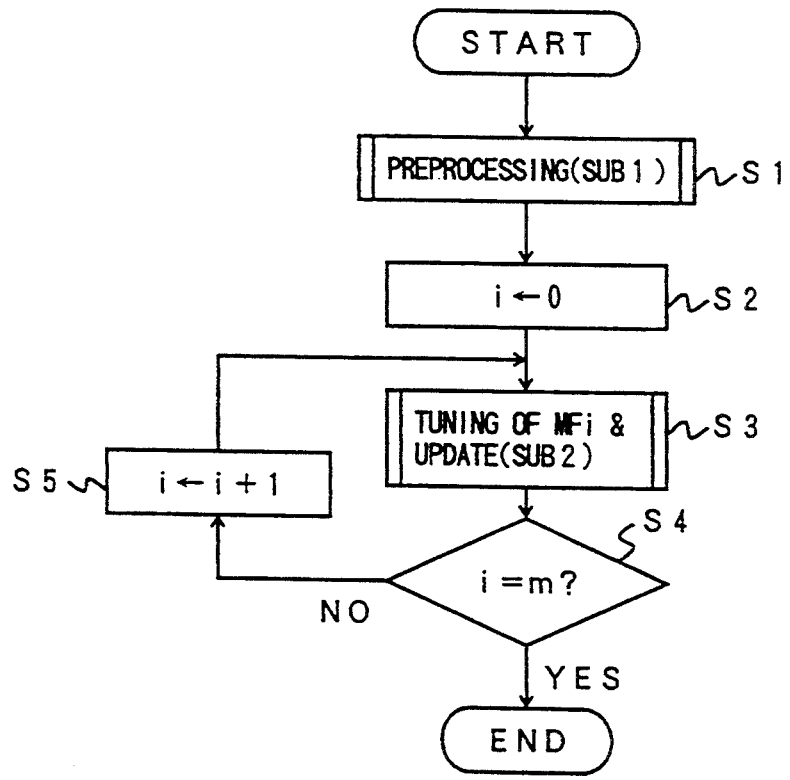
FIG. 4 is a flow chart of a main routine of a control program of a first embodiment according to the present invention.

The sequencer 66 performs the calculations shown in FIG. 4.

After the control program has been started, the sequencer 66 first executes the preprocessing subroutine SUB1 shown in FIG. 4 (Step 1). The counter 'i' is set to 0 (i=0) (Step 2). The sequencer 66 then executes the tuning and the updating-subroutine SUB 2 and the conclusion-membership function $MF_i$ corresponding to said counter 'i' is tuned and updated individually (Step 3). After the execution of the updating processing, there is a check (Step 4) for whether or not the counter 'i' is a predetermined number m. If the counter i≠m in the processing of Step 4, then the counter 'i' is incremented (i=i+1)(Step 5).

The sequencer 66 then repeats the tuning and the updating of the conclusion-membership function corresponding to the next number of counter (Step 3). In addition, if the result of the check (Step 4) of the counter 'i' is i=m, then the sequencer 66 ends the execution of the control program as the tuning and the updating of all of the conclusion-membership functions has been completed.

Figure 5:
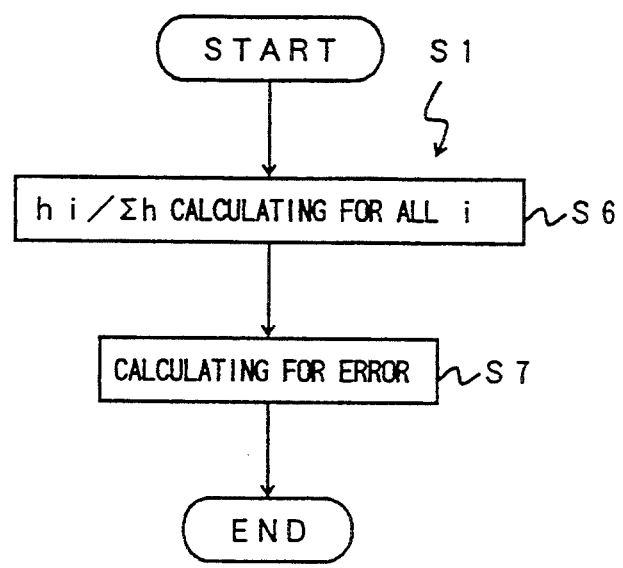
FIG. 5 is a flow chart of a sub-routine of a control program of a first embodiment according to the present invention.

The following is a description of the subroutine SUB1 shown in FIG. 4, with reference to FIG. 5.

The distance calculation portion 61 of the tuning apparatus 6 first inputs the degree of contribution $h_i$ of each of the conclusion-membership functions $MF_i$ when the predetermined input value $D_{ini}$ is given for all of the counters 'i'. Furthermore, the distance calculation portion 61 then calculates the ratio (hi/Σh) of the heights of each of the conclusion-membership functions in the total sum of heights of all of the conclusion-membership functions in the defuzzy calculation for said inference (Step 6). After this, the error calculation portion 62 inputs the inference expected value $D_{EXP}$ from the learning data memory 1 and the inference output value $D_{OUT}$ from the inferential apparatus 2. The error calculation portion 62 calculates the error between the inference expected value $D_{EXP}$ and the inference output value $D_{OUT}$ (Step 7). The subroutine SUB1 transfers to Step 2 of the main routine of FIG. 3 when the above described processing sequence ends.

Figure 6:
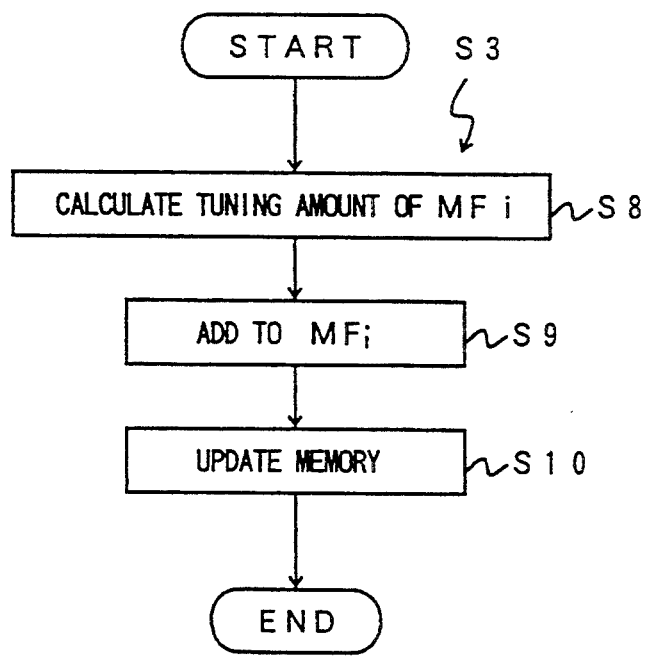
FIG. 6 is a flow chart of an updating-subroutine of the tuning according to the present invention.

The following is a description of the the $MF_i$ tuning and the updating-subroutine SUB2 and shown in FIG. 4, with reference to FIG. 6.

The multiplier 63 inputs the ratio which is the result of the calculation of the ratio calculation portion 61, the error which is the result of the calculation of the error calculation portion 62 and the learning constant $\eta$ which is stored in the learning constant memory 64. The multiplier 63 multiplies the distance, the error and the learning constant $\eta$ and outputs values to tune the conclusion-membership function $MF_i$ (Step 8). The adder 65 adds the tuning value of the membership function $MF_i$ to the previous conclusion-membership function $MF_i$ stored in the conclusion-membership function memory 4 (Step 9).

New conclusion-membership function $MF_i'$ outputted from the adder 65, is stored to the conclusion-membership function memory 4 so that the contents of the conclusion-membership function memory 4 are renewed (Step 10). When the processing of this subroutine SUB2 ends, there is shift to the processing of Step 4 of the main routine shown in FIG. 4.

Moreover, the distance calculation portion 61 uses only the degree of contribution $h_i$ input from the inferential apparatus 2 to calculate the distance but the degree of contribution $h_i$ input from the inferential apparatus 2 and the total degree of contribution A can be used together. In this case, the total sum of degrees of contribution A is given by following equation.

$$A = \sum_{i}^{m} h_i \tag{7}$$

The relationship between the degree of contribution and the conclusion-membership function is shown in Table 1.

TABLE 1

|        | $MF_1$ | $MF_2$ | $MF_3$ | $MF_4$ |
|--------|--------|--------|--------|--------|
| $MF_i$ | 100    | 200    | 400    | 500    |
| $h_i$  | 70     | 90     | 20     | 20     |

Figure 7:
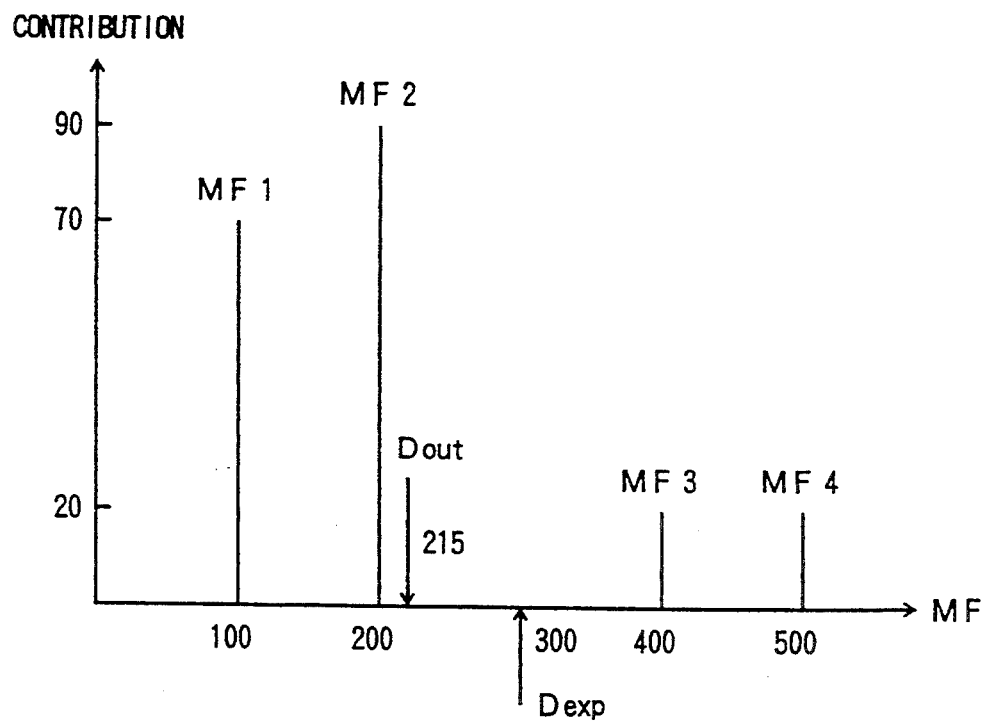
FIG. 7 is a view describing the conclusion-membership function prior to tuning.

As an example, FIG. 7 shows the relationship between the four conclusion-membership functions $MF_1 \sim MF_4$ shown in Table 1 and prior to tuning, and their degrees of contribution $h_1 \sim h_4$. The horizontal axis in FIG. 7 gives the position of the conclusion-membership function $MF_i$ while the vertical axis gives the degree of contribution $h_i$ corresponding to the $MF_i$.

Figure 8:
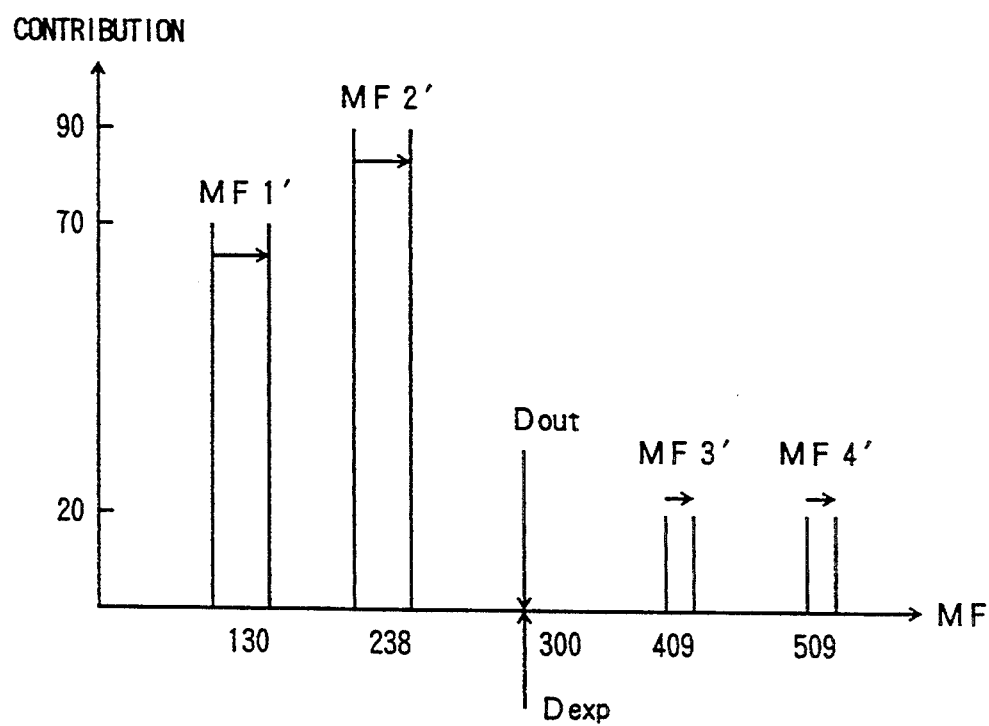
FIG. 8 is a view describing the conclusion-membership function after tuning.

Here, when the inference output $D_{OUT}=215$, and the output expected value $D_{EXP}=300$, the tuning apparatus 6 tunes for these using a learning constant of $\eta=1$. When these numerical values are substituted into equation (6), the new conclusion-membership function $MF_i'$ is obtained by means of equations (8) through (11) shown below. FIG. 8 is obtained from the results thus obtained. In the same manner as shown in FIG. 7, FIG. 8 shows the position of the conclusion-membership function $MF_i$ on the horizontal axis and the degree of contribution $h_i$ corresponding to the $MF_i'$ on the vertical axis.

$$MF_{1'} = 100 + (215 - 300) \times \frac{70}{70 + 90 + 20 + 20} \approx 130 \tag{8}$$

$$MF_{2'} = 200 + (215 - 300) \times \frac{90}{70 + 90 + 20 + 20} \approx 238 \tag{9}$$

$$MF_{3'} = 400 + (215 - 300) \times \frac{20}{70 + 90 + 20 + 20} \approx 409 \tag{10}$$

$$MF_{4'} = 500 + (215 - 300) \times \frac{70}{70 + 90 + 20 + 20} \approx 509 \tag{11}$$

As shown above, if sufficient learning data are supplied, the tuning apparatus 6 according to a first embodiment according to the present invention can generate a suitable conclusion-membership function in accordance with a predetermined condition-membership function and rule. In addition, if the conclusion-membership function from the conclusion-membership function memory 4 is given, then the tuning apparatus 6 of the present embodiment automatically adjusts so that the between the error inference output $D_{OUT}$ and the output expected value $D_{EXP}$ is minimal. Furthermore, even when an initial value of conclusion-membership function is at random, the tuning apparatus 6 can complete a fuzzy system if a condition-membership function and rule are decided.

Not only this, the tuning apparatus 6 can even generate a conclusion-membership function suited to a condition-membership function or a rule in cases where a condition-membership function or rule has been corrected.

[SECOND EMBODIMENT]

The following is a description of a second embodiment according to the present invention.

Figure 9:
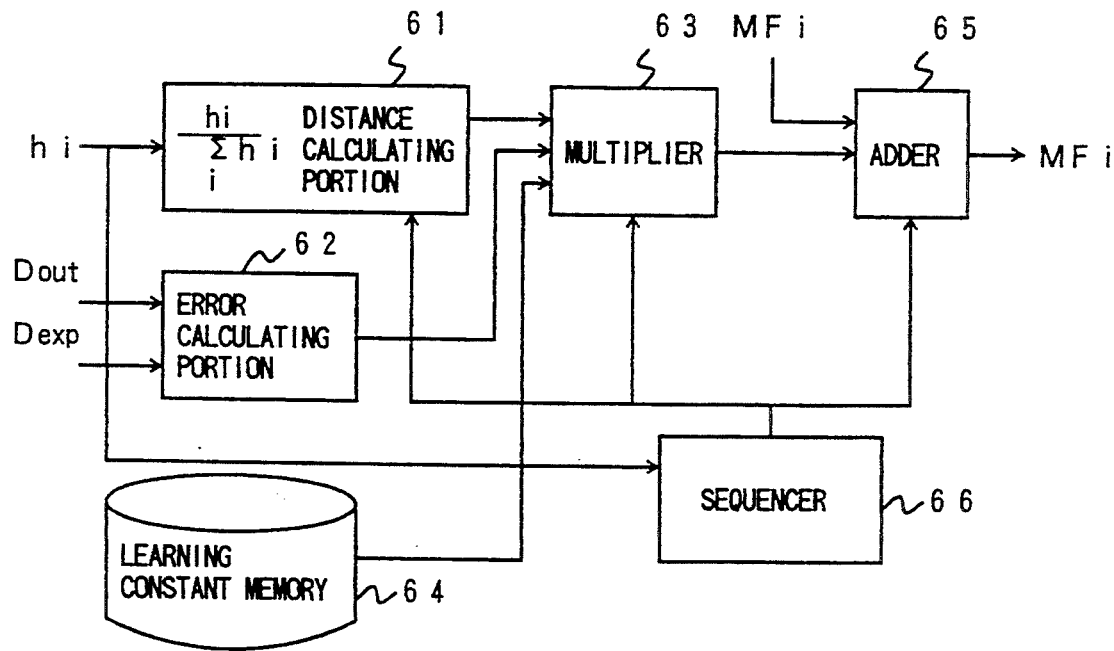
FIG. 9 is a block diagram of a circuit of a second embodiment according to the present invention.

FIG. 9 is a block diagram of a circuit of a second embodiment according to the present invention. The constitution shown in FIG. 9 is the same as that shown in FIG. 3 but the degree of contribution of the conclusion-membership function $MF_i$ output from the inferential apparatus 2 is input to the sequencer 66 as well as the distance calculation portion 61.

The following is a description of the calculation of the sequencer 66 of the second embodiment.

Figure 10:
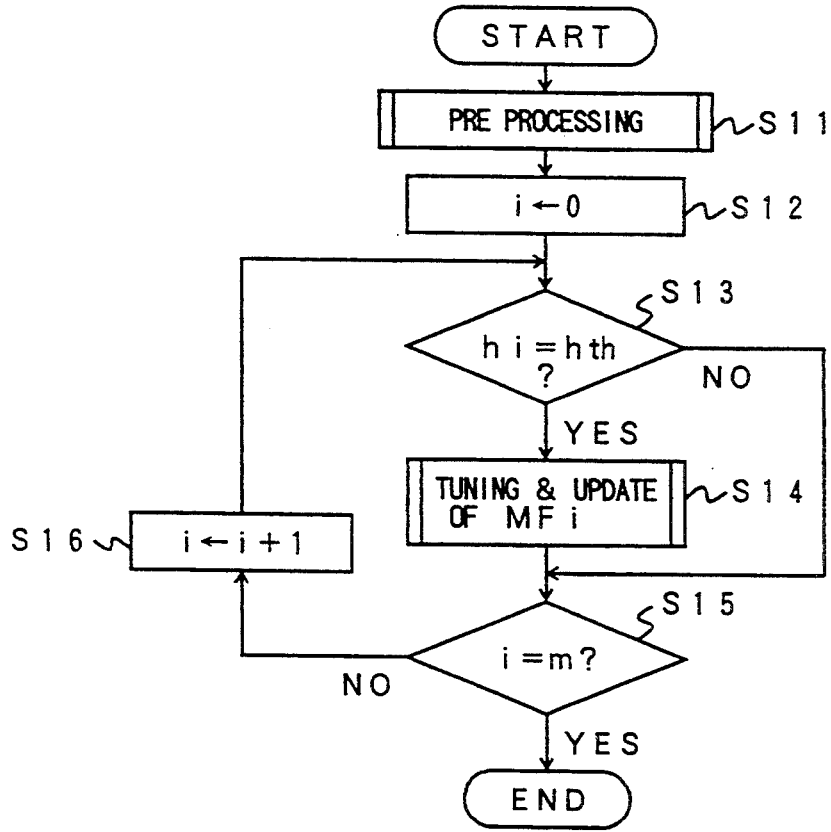
FIG. 10 is a flowchart of a main routine of a control program of a second embodiment according to the present invention.

FIG. 10 is a flowchart of a main routine of a control program of a second embodiment according to the present invention.

The sequencer 66 first executes the preprocessing subroutine SUB1 (step 11). This preprocessing subroutine SUB1 is the same as that of the subroutine SUB1 used in the first embodiment. The counter 'i' is then set to 0 (i=0) (Step 12). It is then determined whether the degree of contribution $h_i$ input from the inferential apparatus 2 is larger than a predetermined lower limit value $h_{th}$ (Step 13). When the degree of contribution $h_i$ is larger than the predetermined lower limit value $h_{th}$ in Step 13, subroutine SUB2 is executed (Step 14) in order to allow the tuning and the updating of the conclusion-membership function $MF_i$. Moreover, this subroutine is the same as the subroutine SUB2 used in the first embodiment. There is then a check (Step 15) for whether or not the counter 'i' is predetermined number 'm'. If the counter i≠m, the counter 'i' is incremented (i=i+1) (Step 16) and the processing is shifted to Step 13. In Step 13, the subroutine SUB2 is not executed when the result of the check is that the degree of contribution $h_i$ is less than the predetermined lower limit value $h_{th}$. In Step 15, processing for the input of all conclusion-membership functions ends when it is determined that the counter 'i' is 'm'.

In the present embodiment, there is the limit that the conclusion-membership function $MF_i$ to be tuned. Then, the object of tuning is just important conclusion-membership function, and have a degree of which contribution hi which exceeds the lower limit value $h_{th}$ for the threshold, so it is possible to shorten the time for tuning since there are fewer $MF_i$ for processing, and to reduce the hardware and subsequent cost.

[THIRD EMBODIMENT]

The following is a description of a third embodiment according to the present invention.

The constitution of the tuning apparatus of the present embodiment is the same as the constitution of the second embodiment, and the degree of contribution $h_i$ from the inferential apparatus 2 is input to the distance calculation portion 61 and the sequencer 66. The following is a description of an example of other calculation of the sequencer 66 for the case of the present embodiment.

Figure 11:
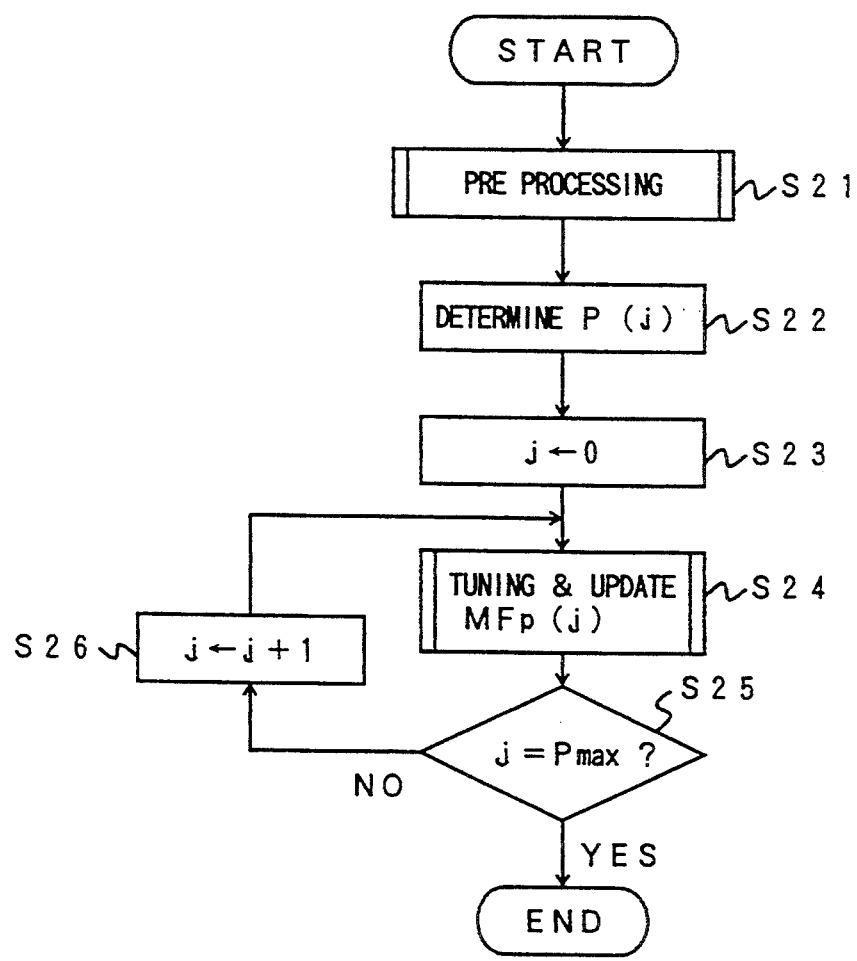
FIG. 11 is a flowchart of a main routine of a control program of a third embodiment according to the present invention.

FIG. 11 is a flowchart of a main routine of a control program of a third embodiment according to the present invention. The sequencer 66 first executes the preprocessing subroutine SUB1 (Step 21). This preprocessing subroutine SUB1 is the same as the subroutine used in the first and second embodiments. The order $P_{(j)}$ f the conclusion-membership function $MF_i$ is then determined as the order of ascending degree of contribution $h_i$ (Step 22). Here, when the conclusion-membership functions $MF_i$ are in order of ascending degree of contribution, $P_{(j)}$ is a variable which expresses the order of $P_{(j-1)}=i$ when the order of a conclusion-membership function $MF_i$ is the J'th.

After this, the variable 'j' is made 0 (j=0) (Step 23). The subroutine SUB2 is executed (Step 24) for tuning and for updating of the conclusion-membership function $MF_{P(j)}$ for j=0. This subroutine SUB2 is the same as the subroutine used in the first and second embodiments. A determination is then made (Step 25) as to whether the order value 'j' is the number $P_{max}$ or not. In Step 25, if j≠$P_{max}$, the variable j in incremented (j=j+1) (Step 26). The processing including and following the subroutine SUB2 for tuning and updating of the next conclusion-membership function $MF_{P\,(j)}$ in order is repeated until j=$P_{max}$. In Step 25, it is determined that the subroutine SUB2 for updating and tuning of the conclusion-membership functions $MF_{P\,(j)}$ which are object of tuning is completed when j=$P_{max}$ and the processing ends.

In the present embodiment, the conclusion-membership function $MF_i$ which is the object of tuning is limited to those having an importance higher than a predetermined order and so it is possible to shorten the time for tuning since there are fewer $MF_i$ for processing, and to reduce the hardware and subsequent cost.

[FOURTH EMBODIMENT]

In the first through third embodiments, the processing for the each updating and tuning of conclusion-membership function $MF_i$ is executed only once. With such a tuning method, the learning constant $\eta$ is set to 1 or a value close to 1. Then, a later tuned learning data becomes to wrong, when the learning constant is nearly "1", the learning data inferences to conclusion-membership function $MF_i$ seriously. Accordingly, the present embodiment proposes a method where the learning constant $\eta$ is set close to 0 and where each of the item of learning data of the user is reflected evenly in the conclusion-membership function $MF_i$.

With the present embodiment, the sequence of processing which is individually executed by the sequencer 66 for the tuning and updating of the conclusion-membership function $MF_i$ of the object of tuning, is termed one frame, and this frame is repeated for a predetermined number of times.

Figure 12:
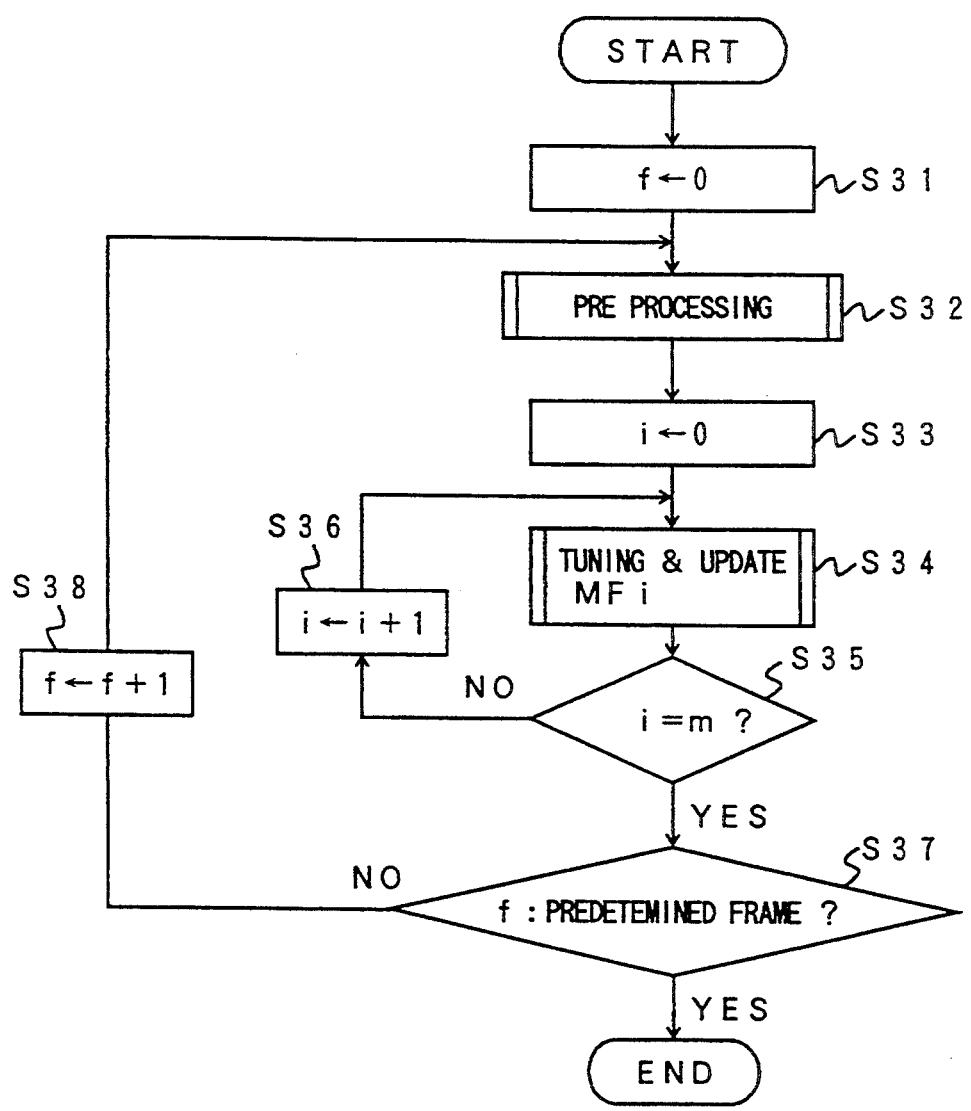
FIG. 12 is a flowchart of a main routine of a control program of a fourth embodiment according to the present invention.

FIG. 12 is a flowchart of a MIN routine of control program of a fourth embodiment according to the present invention.

The sequencer 66 first initialize the frame number f(f=0) (Step 31). This frame number "f" is a variable expressed as f=F−1. And "F" is the number of times the frame is repeated, Once the frame number 'f' has been set to 0 (Step 31), the sequencer 66 executes the preprocessing subroutine SUB1 (Step 32). Furthermore, the counter 'i' is initialized (i=0) (Step 33). Next, the sequencer 66 executes tuning of the conclusion-membership function $MF_i$ and the updating-subroutine SUB2 (Step 34). Moreover, this updating-subroutine SUB2 is a subroutine which is shared by all the embodiments. It is then determined for whether the counter 'i' is the same as the number 'm' of the conclusion-membership functions $MF_i$ which are the object of processing (Step 35). In Step 35, the counter 'i' is incremented (i=i+1) (Step 36) when it is determined that the counter 'i' is not equal to 'm'. In Step 35, this processing is repeated until the counter 'i' becomes equal to 'm'. When it is determined that the counter 'i' is equal to 'm' (i=m), processing for the updating-subroutine SUB2 and the conclusion-membership functions $MF_i$ ends. Here, there is check (Step 37) for whether the frame number 'f' has reached a predetermined count or not. In Step 37, the frame number 'f' is incremented (f=f+1) (Step 38) when the frame number has not reached the predetermined count, and the processing of step 32 onwards (the processing for the next frame) is repeated. In addition, if in Step 37, the frame number 'f' has become equal to a predetermined number, the predetermined number of frames have been executed and the processing ends.

The predetermined tuning for a plural number of frames in this manner enables the learning coefficient $\eta$ to approach zero and so it is possible for each of the items of learning data of the user to be evenly reflected in the conclusion-membership function.

In addition, if there is leaning data which the user intentionally wishes to emphasize, it is possible to emphasize it by changing the learning data within a frame or by a method where the same learning data is used two or more times within the one frame.

[FIFTH EMBODIMENT]

The fourth embodiment described above performs tuning which is desired by the user and so it is not possible to predict the number of times which a frame should be repeated. However, with the method of the present embodiment, it is not necessary for the user to consider the number of frame repetition.

With the present embodiment, the sequencer 66 monitors the amount of change or the amount of difference between the output expected value and the output result for each frame of each tuning, or for each tuning of each conclusion-membership function, and ends the tuning ends when these have become equal to the predetermined value.

Figure 13:
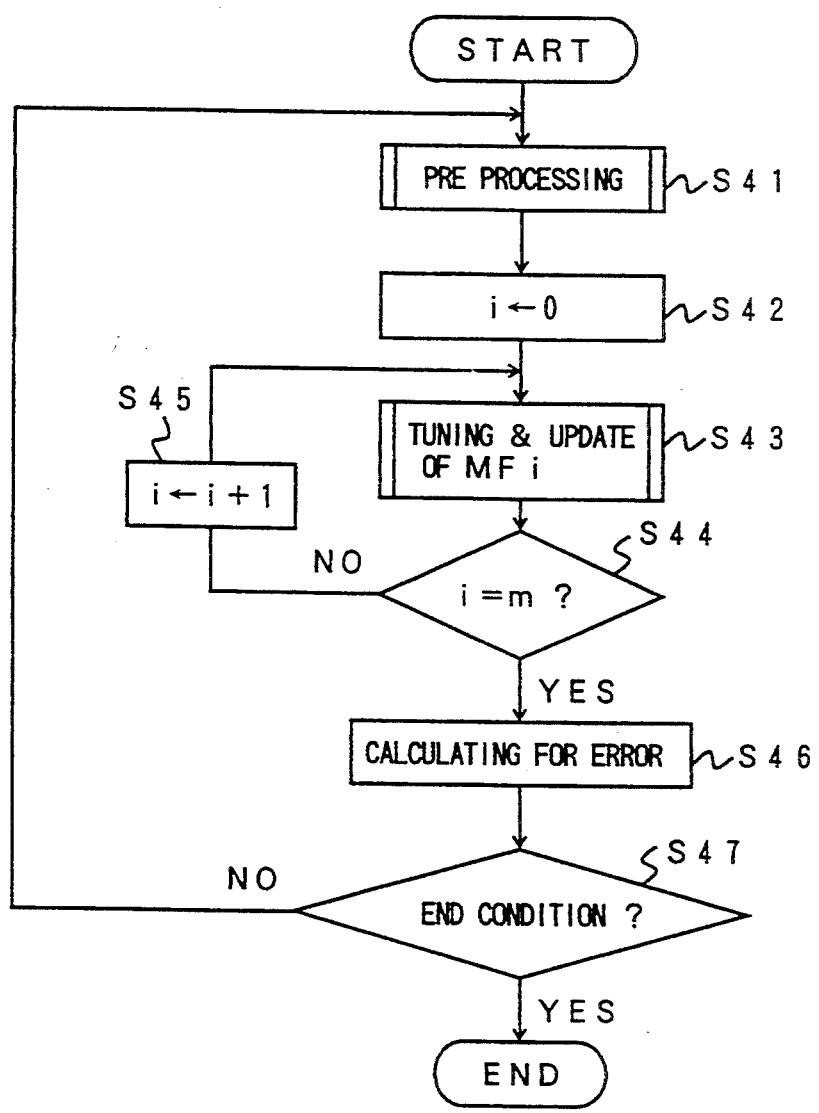
FIG. 13 is a flowchart of a main routine of a control program of a fifth embodiment according to the present invention.

FIG. 13 is a flowchart of a main routine of a control program of a fifth embodiment according to the present invention.

The sequencer 66 first executes the preprocessing subroutine SUB1 (Step 41). Then, the counter 'i' is set to the initial value of 0 (i=0) (Step 42) and tuning the updating-subroutine SUB2 and are executed with respect to the conclusion-membership function $MF_i$ (Step 43). It is then a determined (Step 44) whether the counter 'i' has become equal to the count 'm' of the conclusion-membership function $MF_i$ of the object of processing.

In this Step 44, the counter 'i' is incremented (i=i+1) (Step 45) when the counter 'i' is not equal to the count m (i≠m), and the updating-subroutine SUB2 and tuning with respect to the next conclusion-membership function is executed (Step 43). In addition, in Step 44, the updating and the tuning with respect to the 'm' conclusion-membership functions $MF_i$ which are the object of processing ends when it is judged that the counter 'i' and 'm' are equal, and the error between the inference output $D_{OUT}$ and the output expected value $D_{EXP}$ is calculated (Step 46). It is then a determined (Step 47) whether this error is suitable for the end condition. When it is judged in Step 47 that the error is not suitable for the end condition, the step of the preprocessing subroutine SUB1 and subsequent steps are repeated (Steps 41~46). This control program then ends when the error is suitable for the end condition.

This end condition can be one of the following: The error becomes a certain value, the error becomes larger than a certain value, the error becomes less than a certain value, the error is a value equal to or larger than a certain value, or smaller than some other condition.

According to the fifth embodiment, tuning and updating with respect to the conclusion-membership function $MF_i$ is executed until the error satisfies the end condition and so it is possible for the user to perform the desired tuning. Furthermore, if the user performs the desired tuning, then there is the end of the processing for tuning and updating with respect to the conclusion-membership function $MF_i$ and so unnecessary repetition of processing with respect to the conclusion-membership function $MF_i$ is prevented.

Moreover, the judge for ending in Step 47 of the fifth embodiment can be substituted with a method which performs a check for whether or not the amount of change in the error between the inference output $D_{OUT}$ and output expected value $D_{EXP}$ is suited to a predetermined end condition.

In addition, the fifth embodiment determines the error in Step 46 for each time processing ends for one frame and then performs a check in Step 47 for that error. This processing can be substituted with processing which performs a check for the error of Step 47 and the calculation of the error from Step 46, at the end of each updating and tuning with respect to a single conclusion-membership function $MF_i$, and when the end condition is not satisfied, executes the updating-subroutine SUB2 and tuning with respect to the next conclusion-membership function $MF_i$, and then ends the control program when the end condition is satisfied.

[SIXTH EMBODIMENT]

Figure 14:
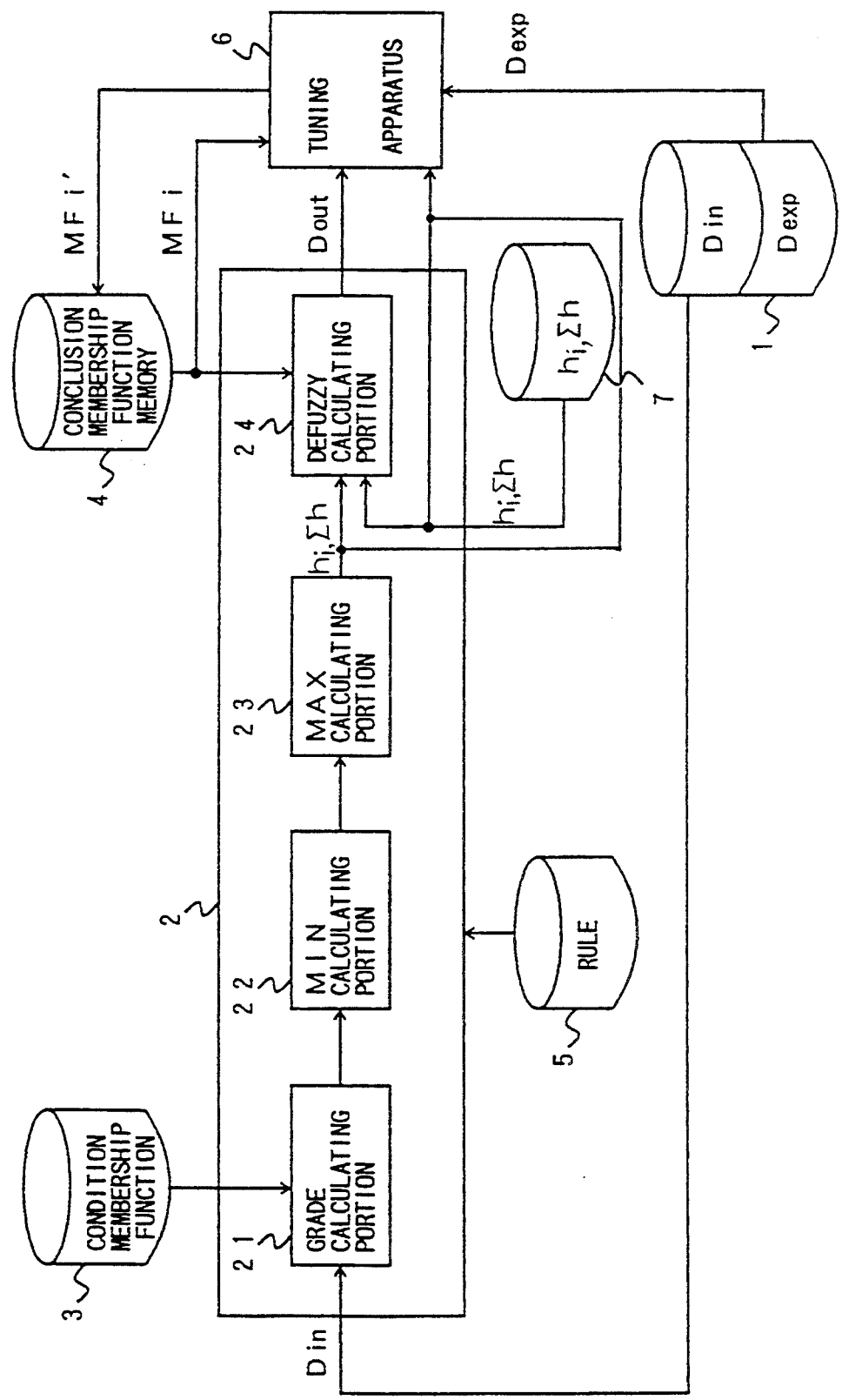
FIG. 14 is a block diagram of a circuit of a second inference system to which the present invention has been applied.

The constitution of the sixth embodiment shown in FIG. 14 has the constitution of the inference system shown in FIG. 1, but is provided with a degree of contribution memory 7 which stores the degree of contribution hi and the total sum $\Sigma h_i$ output by the MAX calculation portion 23 of the inferential apparatus 2 for the initial frame. By this provision, the degree of contribution $h_i$ and the total sum $\Sigma h_i$ stored in the degree of contribution memory 7 are sent to the tuning apparatus 6 and the defuzzy calculation portion 24 in the second and later frames.

In the sixth embodiment, when there is the storage of the degree of contribution memory 7 for the second and later frames and the input from the conclusion-membership function memory 4, the tuning apparatus 6 can repeat the defuzzy calculation alone for either the tuning of each single frame or the tuning of each conclusion-membership function $MF_i$. Because of this, the tuning apparatus 6 can realize high-speed processing overall because apart from the defuzzy calculation, the calculation has been shortened.

Accordingly, the membership function tuning apparatus according to the present invention can generate a conclusion-membership function suitable for the rule and a suitable condition-membership function and according to a given rule and condition-membership function when sufficient learning data has been given.

In addition, if a conclusion-membership function has been given beforehand to the tuning apparatus 6, there is automatic tuning so that the error between the inference expected value from the learning data memory 1 and the inference output from the inferential apparatus 2 is minimized.

Furthermore, even if useless initial values are applied, the tuning apparatus 6 can automatically generate a suitable conclusion-membership function if a condition-membership function and rule are created, and thereby complete a fuzzy inference system.

In addition, conclusion-membership function must be corrected generally every time after the condition-membership function and the rule are corrected. But, that can be performed automatically so that the adjustment of the condition-membership function is simplified.

The tuning apparatus 6 of the present invention functions so that the conclusion-membership function which is the object of tuning is either limited to a function exceeding a certain height, or limited to the n largest height values. By doing this, the conclusion-membership function which is the object of tuning can greatly influence the fuzzy inference, and tuning can be limited to only those which are important, thereby shortening the processing time and enabling reductions of the hardware and cost.

In addition, the tuning apparatus 6 of the present invention has one frame being the sequence of processing for the individual execution in order of tuning, and repeats this frame for a certain number of times. This enables the learning data to be set to a value close to zero, and each of the learning data items of the user to be evenly reflected in the conclusion-membership function. In this processing, it is possible to change the learning data within the frame or to use the same learning data two or more times within the same frame if there is learning data which the user wishes to emphasize.

In addition, the tuning apparatus 6 of the present invention monitors the amount of change or error between the output results obtained by tuning of the conclusion-membership function and the output expected value when there is repeated processing by frame, and ends tuning when these have reached a predetermined value. Doing this means that unnecessary tuning is not performed after the user has performed the predetermined tuning.

Furthermore, either prior to or during the execution of the first frame, the total sum of heights and each of the heights of the membership functions necessary for tuning are stored for the input values and the output expected value in the tuning processing repeated for the frames, and these total sum of heights and individual heights of the membership functions stored are read, rather than recalculated, from the second tuning onwards and only the defuzzy calculation is executed. This enables the tuning apparatus 6 of the present invention to eliminate processing other than defuzzy calculation for the second and later tuning.

Further, the present invention is not limited to these embodiments, but various variations and modifications may be made without departing from the scope of the present invention.

What is claimed is:

1. A tuning apparatus which tunes a membership function to perform a fuzzy inference using a singleton as the conclusion-membership function, said tuning apparatus comprising:
   a) an error calculation means for receiving an output result of fuzzy inference and an output expectation value, and for redetermining an error between the output result of fuzzy inference and the output expectation value with respect to an input value of fuzzy inference;
   b) a distance calculation means for receiving a height signal, and for calculating:
      1) a total sum of heights of conclusion membership functions in a defuzzy calculation in said fuzzy inference,
      2) a ratio of a height of each conclusion-membership function to said total sum, and
      3) a distance in proportion to said ratio;
   c) an updating means, connected to said error calculation means to receive the error and to said distance calculation means to receive the distance, for tuning and updating the conclusion-membership function by shifting a position of said conclusion-membership function according to said distance calculated by said distance calculation means and the error determined by said error calculation means; and
   d) a control means to which said error calculation means, said distance calculation means and said updating means are connected, for controlling said error calculation means, said distance calculation means and said updating means.

2. The tuning apparatus as claimed in claim 1, wherein said control means makes the object of tuning a conclusion-membership function having a height higher than the height of a predetermined conclusion-membership function.

3. The tuning apparatus as claimed in claim 1, wherein said control means defines an object of tuning to be a conclusion-membership function occurring before a predetermined position when said degree of contributions are arranged in order of descending.

4. The tuning apparatus as claimed in claim 1, wherein said control means defines as a frame a sequence of processing comprising a single execution of tuning for all conclusion-membership functions which are object of tuning, and repeatedly executes said frame a predetermined number of times.

5. The tuning apparatus as claimed in claim 4, wherein said control means monitors amounts of change of an output expectation value and an output result for each frame of each tuning, or for each tuning of each membership function which is the object of tuning, and ends tuning when said amount of change is equal to a predetermined value.

6. The tuning apparatus as claimed in claim 5, wherein said tuning apparatus further comprises:
   means for reading:
      (1) said individual degrees of contribution, and
      (2) a total sum of degrees of contribution of said membership function,
   from said storage means when there is tuning of second and later frames by said control means and execution of only a defuzzy calculation.

7. The tuning apparatus as claimed in claim 4, wherein said tuning apparatus further comprises:
   storage means for storing individual degrees of contribution of membership functions which are necessary for tuning and a total sum of degrees of contribution, either prior to or during execution of a first frame.

8. The tuning apparatus as claimed in claim 1, wherein said control means monitors an error between an output expected value and an output result for each frame of each tuning, or for each tuning of each conclusion-membership function, and ends processing when said error is equal to a predetermined value.

* * * * *